(12) United States Patent
Biyani et al.

(10) Patent No.: US 11,795,362 B1
(45) Date of Patent: Oct. 24, 2023

(54) SUSTAINABLE SOLID LUBRICANT FOR DRILLING FLUID

(71) Applicant: Halliburton Energy Services, Inc., Houston, TX (US)

(72) Inventors: Mahesh Vijay Biyani, Pune (IN); Sharad Bhimrao Gotmukle, Pune (IN); Nivika Rajendra Gupta, Pune (IN); William W. Shumway, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/977,470

(22) Filed: Oct. 31, 2022

(51) Int. Cl.
| | |
|---|---|
| *C09K 8/20* | (2006.01) |
| *E21B 21/00* | (2006.01) |
| *E21B 21/06* | (2006.01) |

(52) U.S. Cl.
CPC ............ *C09K 8/206* (2013.01); *E21B 21/062* (2013.01); *C09K 2208/04* (2013.01); *C09K 2208/34* (2013.01)

(58) Field of Classification Search
None
See application file for complete search history.

(56) References Cited

U.S. PATENT DOCUMENTS

| | | | | |
|---|---|---|---|---|
| 3,042,607 A | * | 7/1962 | Morris | E21B 21/003 |
| | | | | 507/104 |
| 6,630,429 B1 | * | 10/2003 | Cremeans | C09K 8/514 |
| | | | | 507/104 |
| 7,507,694 B2 | | 3/2009 | Shumway et al. | |
| 8,030,252 B2 | | 10/2011 | Shumway | |
| 8,691,733 B2 | | 4/2014 | Miller et al. | |
| 10,106,718 B2 | | 10/2018 | Villarreal et al. | |
| 10,329,859 B2 | | 6/2019 | Gupta et al. | |
| 10,428,258 B2 | | 10/2019 | Galindo et al. | |

(Continued)

FOREIGN PATENT DOCUMENTS

| | | | | |
|---|---|---|---|---|
| CN | 104371674 A | * | 2/2015 | ............. C09K 8/035 |
| WO | 2017213657 A1 | | 12/2017 | |

(Continued)

OTHER PUBLICATIONS

JP H08502881A Apr. 2, 1996 (Year: 1996).*
AU 2012340620 A1 Jun. 26, 2014 (Year: 2014).*

*Primary Examiner* — Charles R Nold
(74) *Attorney, Agent, or Firm* — Thomas Rooney; C. Tumey Law Group PLLC

(57) ABSTRACT

A method of drilling is disclosed that includes introducing a water-based drilling fluid into a drill string disposed within a wellbore, circulating the water-based drilling fluid through the drill string and the wellbore, and extending the wellbore using the drill string while circulating the water-based drilling fluid, wherein the water-based drilling fluid includes water and a lubricating additive including a de-oiled cake, wherein the de-oiled cake are residues obtained after extraction of oil from a plant source, wherein the de-oiled cake is in particulate form having a particle size of 100 microns or less. A composition is disclosed that includes water-based drilling fluid including water and a lubricant additive comprising a de-oiled cake, wherein the de-oiled cake are residues obtained after extraction of oil from a plant source and wherein the de-oiled cake has a particle size of 100 microns or less.

20 Claims, 1 Drawing Sheet

(56) References Cited

U.S. PATENT DOCUMENTS

| | | |
|---|---|---|
| 10,590,323 B2 | 3/2020 | Davis et al. |
| 10,988,657 B2 | 4/2021 | Shumway et al. |
| 11,021,640 B2 | 6/2021 | Shumway et al. |
| 11,091,681 B2 | 8/2021 | Gupta et al. |
| 11,174,422 B2 | 11/2021 | Nehete et al. |
| 11,279,863 B2 | 3/2022 | Gupta et al. |
| 11,319,788 B1 | 5/2022 | Shumway |
| 2017/0362490 A1 | 12/2017 | Van Slyke et al. |
| 2021/0040376 A1 | 2/2021 | Devarapalli et al. |
| 2021/0079285 A1 | 3/2021 | Davis et al. |
| 2021/0087456 A1 | 3/2021 | Shumway et al. |
| 2021/0115319 A1 | 4/2021 | Santos et al. |
| 2022/0177767 A1 | 6/2022 | Shumway et al. |

FOREIGN PATENT DOCUMENTS

| | | |
|---|---|---|
| WO | 2018026375 A1 | 2/2018 |
| WO | 2020101683 A1 | 5/2020 |
| WO | 2021071509 A1 | 4/2021 |

\* cited by examiner

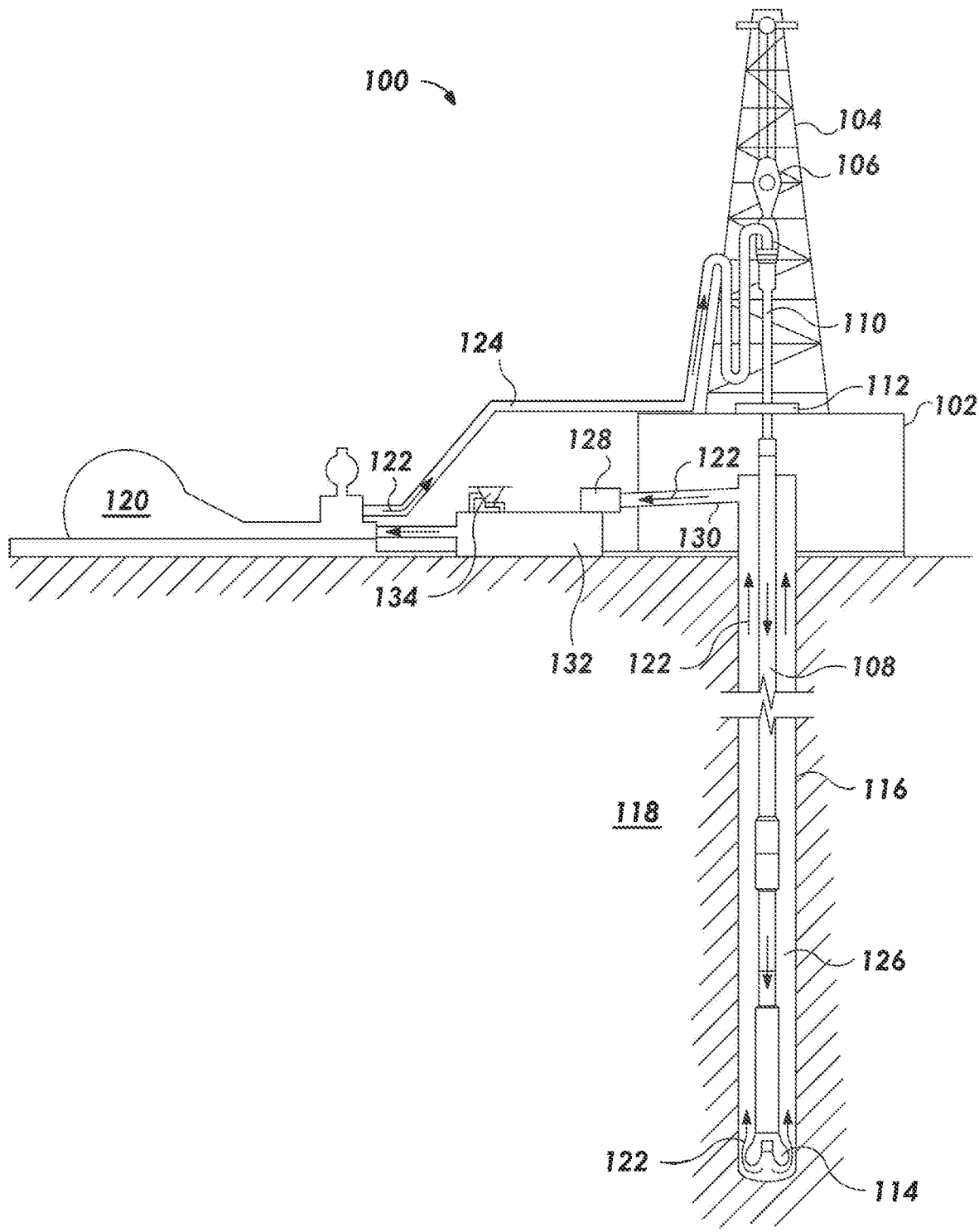

SUSTAINABLE SOLID LUBRICANT FOR DRILLING FLUID

BACKGROUND

A natural resource such as oil or gas residing in a subterranean formation can be recovered by drilling a wellbore into the formation. A wellbore is typically drilled while circulating a drilling fluid through the wellbore. The various functions of a drilling fluid include removing drill cuttings from the wellbore, cooling and lubricating the drill bit, aiding in support of the drill pipe and drill bit, and providing a hydrostatic head to maintain the integrity of the wellbore walls and preventing well blowouts. Drilling fluids often include a plurality of particles that impart properties such as viscosity, density, and capabilities such as wellbore strengthening. Drilling fluid density is controlled such that the drilling fluid provides enough hydrostatic pressure to prevent invasion of formation fluids into the wellbore while not exceeding the fracture gradient of the formation thereby preventing fracturing of the formation. Weighting agents and viscosifiers can be used to produce drilling fluids with a desired viscosity, which affects the pumpability and equivalent circulating density of the drilling fluid. As the drilling fluid is pumped through a drill string and out a drill bit, contact is made between the drilling fluid and the wellbore walls as drilling fluid flows upwards to the surface. This contact creates a drag due to frictions between the flowing drilling fluid and the wellbore walls and the drilling fluid loses some of the pressure supplied by the mud pump in order to overcome this frictional drag. Friction reducers aim to minimize this friction.

Environmental and economic considerations have led to the increasing use of water-based drilling fluids being selected over oil-based drilling fluids. Drilling with water-based muds generally gives rise to high coefficients of friction between the drill-string and the wellbore. A lubricant may be mixed into the water-based drilling fluid which can reduce the coefficient of friction and improve drilling efficiency.

Liquid lubricants form a film thick enough to mask surface roughness and strong enough to withstand high compressional forces. The thickness of the film on the surface ranges from a few nanometers to hundreds of microns. Liquid lubricants are usually formulated with different additives including glycol, hydrocarbon-based materials, mineral oil, ester, and fatty acid ester. Mineral oils may be toxic and cause acidity in the wellbore. Further, insoluble oil builds up in the mud and loss of viscosity occurred. Hydrocarbons and fatty acids are less environmentally friendly than esters and naturally occurring vegetable oil. However, esters affect both the chemical properties of base fluids and changes the drilling fluid rheological properties.

Because liquid lubricants compete with other surface-active components in the drilling fluid, their lubrication performance tends to depend on their concentration. In addition, at high shear rates, these lubricants can become tightly emulsified and so stable that adsorption is inhibited. However, liquid lubricants may affect the chemical properties of the drilling fluids and may change the drilling fluid rheological properties, especially plastic viscosity and yield point. A viscous fluid will typically make a thicker film on the moving surfaces and more power will be needed to displace it. Further, the efficiency of the lubrication will be reduced with increase in solid content in the drilling fluids. Finally, temperatures above 212° F., or 100° C., may limit the performance of the liquid lubricant in water-based drilling fluids because of thermal degradation.

Lubricants for water-based drilling fluids may also include solid lubricants such as graphite-based lubricants, molybdenum disulfide, tungsten disulfide, and polymeric compounds such as polytetrafluoroethylene, for example. However, like liquid lubricants, solid lubricants can have high cost and health, safety, and environmental concerns.

BRIEF DESCRIPTION OF THE DRAWINGS

This drawing illustrates certain aspects of some of the embodiments of the present disclosure and should not be used to limit or define the disclosure.

The FIGURE illustrates a drilling assembly in accordance with some embodiments of the present disclosure.

DETAILED DESCRIPTION

Disclosed herein are solid lubricants for drilling fluids and, more particularly, disclosed are water-based drilling fluids comprising a de-oiled cake.

Directional drilling in extended-reach wells using a water-based drilling fluid has several challenges, including high torque and drag from long contact areas of fluid with the formation and drill string. The nature of the surfaces and the composition of the fluids in which the surfaces are immersed influence the coefficient of friction. Lubricants are used to reduce the coefficient of friction of a drilling fluid including reducing friction in metal-to-metal contact, and to provide lubricity to the drillstring in the open hole, especially in deviated wells, where the drillstring is likely to have continuous contact with the wellbore. Ideally, the lubricants are inert, they do not react with other fluid additives or cuttings, and they will not affect fluid rheology.

Coefficient of friction for oil-based drilling fluids are typically less than 0.1, whereas the coefficient of friction of water-based drilling fluids are typically between 0.2 to 0.6. However, oil-based drilling fluids are less desirable for the environmental hazards they pose, and disposal may be difficult and costly. Therefore, it is becoming increasingly important to provide lubricants to water-based drilling fluids to improve lubricating properties that reduce the chances of drill string getting stuck, lessens the torque, and drag occurrences. Water-based drilling fluids are used to drill a majority of wellbore. The base fluid may be fresh water, seawater, brine, saturated brine, or a formate brine. The type of fluid selected depends upon the anticipated well conditions. For example, surface interval is typically drilled with a low-density water or seawater-based mud that contains few commercial additives. These systems incorporate natural clays in the course of the drilling operation. Some commercial bentonites or attapulgites may be added to aid in fluid-loss control and to enhance hole-cleaning effectiveness. However, regardless of the water-based drilling fluids, lubricants are becoming increasingly important to meet the environmental and financial requirements.

Water-based drilling fluids used herein comprise water as a base fluid and a de-oiled cake lubricating additive.

The base fluid refers to the major component of the fluid (as opposed to components dissolved and/or suspended therein), and does not indicate any particular condition or property of that fluid such as its mass, amount, pH, etc. Aqueous fluids that may be suitable for use as a base fluid in the methods and compositions of the present disclosure may include water from any source. Such aqueous fluids may include fresh water, salt water (e.g., water containing one or more salts dissolved therein), brine (e.g., saturated salt water), seawater, produced water, and any combination thereof. The aqueous fluids may include one or more ionic species, such as those formed by salts dissolved in water. For example, seawater and/or produced water may include a variety of divalent cationic species dissolved therein. The water-based drilling fluid may contain from 70 vol. % to 99.9 vol. % base fluid. Alternatively, from 70 vol. % to 80 vol. % base fluid, from 80 vol. % to 90 vol. % base fluid, from 90 vol. % to 99.9 vol. % base fluid, or any ranges therebetween. Alternatively, the water-based drilling fluid may contain from 70 wt. % to 99.9 wt. % base fluid. Alternatively, from 70 wt. % to 80 wt. % base fluid, from 80 wt. % to 90 wt. % base fluid, from 90 wt. % to 99.9 wt. % base fluid, or any ranges therebetween.

The de-oiled cake lubricating additive is a byproduct from the edible oil processing industry. Oil cake is the coarse residue obtained after oil extraction from various oil seeds containing fatty acids. Oil seeds are second only to grain crops in the supply of plant proteins for human and animal consumption. De-oiled cake is the residue obtained after the extraction of oil from the oil seed, typically by expelling or solvent extraction. Oil seed cakes are rich in fibrous solid material with some residual seed oil and have high concentration of non-starch polysaccharides. The chemical composition and residual oil content of the de-oiled cake can vary according to the seed oil the oil was extracted from and the extraction method used to extract the oil from the plant source. Suitable de-oiled cakes may include, without limitation, de-oiled cake obtained from plant source comprising at least organic material selected from the group comprising mustard seeds, almond, argan, borage, castor, cherry, flax, grape, hemp, jojoba, macadamia, mango, neem, coconut, soybean, sunflower, cottonseed, safflower, peanut, palm, rapeseed, corn, olive, oil palm, shea, tonka bean, tung, sesame, walnut, mustard, rice bran, and combinations thereof.

When included in the water-based drilling fluid, de-oiled cake reduces friction within the drilling fluid and surfaces thereby improving torque and drag during wellbore drilling operations in subterranean formations. De-oiled cake has several advantages as a lubricating additive as de-oiled cake is environmentally friendly as the primary components are naturally occurring and biodegradable and the de-oiled cake typically has a lower cost than conventional solid lubricating additives.

The de-oiled cake may be in particulate form. In embodiments, the average particle size of the de-oiled cake particles is reduced by finely grinding or otherwise reducing the particle size. The reduced size particles are sieved or otherwise separated to select for a desired particle size or particle size range. The selected particles of de-oiled cake particles as included in the water-based drilling fluid as a lubricating additive. As will be shown in the examples below, the size reduction and selection of particle sizes has pronounced effect on reducing the coefficient of friction which is on par or better than conventional solid lubricants. In embodiments, the volume-based particle size median particle size of the de-oiled cake, $D_{50}$, is less than 100 μm (microns). Alternatively, the de-oiled cake has a $D_{50}$ of less than 90 μm, less than 80 μm, less than 70 μm, or less than 60 μm. In some examples, the particles of de-oiled cake may be selected such that all the particles have an average particle size such that the largest measured dimension of the particles is less than 100 μm. Alternatively, the de-oiled cake has an average particle size such that the largest measured dimension of the particles is less than 90 μm, less than 80 μm, less than 70 μm, less than 60 μm. In embodiments, the de-oiled cake may be selected such that the largest measured dimension of the particles is in a range of 30 μm to 100 μm, in a range of 50 μm to 100 μm, in a range of 80 μm to 100 μm, in a range of 30 μm to 50 μm, in a range of 50 μm to 80 μm, or any ranges therebetween. The particle sizes, including, $D_{50}$ particle size values for a particular sample may be measured by commercially available particle size analyzers such as those manufactured by Malvern Instruments, Worcestershire, United Kingdom.

In embodiments, the de-oiled cake may have had at least 99%, at least 95%, at least 90% or at least 85% of the oil extracted therefrom. In some embodiments, the de-oiled plant may include 10% oil or less, 5% oil or less, 4% oil or less, 3% oil or less, 2% oil or less, 1% oil or less, 0.5% oil or less, all by weight of the de-oiled cake. In some embodiments, the de-oiled plant material may include 10% oil or less, 5% oil or less, 4% oil or less, 3% oil or less, 2% oil or less, 1% oil or less, 0.5% oil or less, by weight of the de-oiled cake.

In embodiments, the de-oiled cake may be present in the water-based drilling fluids in an amount of from about 0.1 wt. % to about 15 wt. % the water-based drilling fluids. Alternatively, from about 0.1 wt. % to about 1 wt. %, from about 1 wt. % to about 3 wt. %, from about 3 wt. % to about 5 wt. %, from about 5 wt. % to about 8 wt. %, from about 8 wt. % to about 10 wt. %, from about 10 wt. % to about 15 wt. %, or any ranges therebetween. As such, the de-oiled cake is present throughout the water-based drilling fluid column in fluid-loss zone and in non fluid-loss zone.

The de-oiled cake is included in the water-based drilling fluids as a solid lubricant to improve one or more fluid properties. Alternatively, the de-oiled cake may be added as lubricant additive. As will be shown in the Examples below, the de-oiled cake has the ability to reduce the coefficient of friction in wellbore conditions. Water-based drilling fluids comprising the de-oiled cake may have a coefficient of friction in a range of from about 0.09 to about 0.35. Alternatively, in a range of from about 0.09 to about 0.15, in a range of from about 0.15 to about 0.2, in a range of from about 0.2 to about 0.25, in a range of from about 0.25 to about 0.30, in a range of from about 0.30 to about 0.35, or any ranges therebetween. In embodiments, the water-based drilling fluids comprising the de-oiled cake reduce the coefficient of friction in an amount of about 20% to about 80% as compared to the same water-based drilling fluid without the de-oiled cake. The amount of friction reduction may be a function of the amount of de-oiled cake included in the water-based drilling fluid as well as the composition of the water-based drilling fluid. The coefficient of friction for a water-based drilling fluid can be determined using ASTM D3233-19 published in 2020.

In embodiments, components of the water-based drilling fluid may be provided as a "dry mix" to be combined with a base fluid and/or other components prior to or during introducing the water-based drilling fluid into the subterranean formation. In some embodiments, the desired quantity of water may be introduced into a mixer followed by the dry blend. The dry blend may include the de-oiled cake and additional solid additives, for example. Additional liquid additives, if any, may be added to the base fluid as desired prior to, or after, combination with the dry blend. This mixture may be agitated for a sufficient period of time to form the water-based drilling fluid.

In embodiments, the de-oiled cake may be provided as a liquid additive with a carrier fluid with the de-oiled cake disposed in the carrier fluid. The carrier fluid may include an aqueous carrier fluid or an oleaginous carrier fluid. In some embodiments, the desired quantity of water may be introduced into a mixer followed by the liquid additive. Additional dry additives such as a dry blend may be added to the mixer. This mixture may be agitated for a sufficient period of time to form the water-based drilling fluid.

The water-based drilling fluid may further include a weighting agent. Examples of suitable weighting agents include, but are not limited to barite, hematite, calcium carbonate, magnesium carbonate, iron carbonate, zinc carbonate, manganese tetraoxide, ilmenite, sodium chloride (NaCl), potassium chloride (KCl), calcium chloride ($CaCl_2$), formate salts, and any combination thereof. These weighting agents may be at least partially soluble or insoluble in the water-based drilling fluid. The weighting agent may be present in the water-based drilling fluid in an amount of from about 1 wt. % to about 60 wt. % of the water-based drilling fluid. Alternatively, the weighting agent may be present in the water-based drilling fluid in an amount of about 1 wt. % to about 10 wt. %, about 10 wt. % to about 20 wt. %, about 20 wt. % to about 30 wt. %, about 30 wt. % to about 40 wt. %, about 40 wt. % to about 50 wt. %, about 50 wt. % to about 60 wt. %, or any ranges therebetween. Alternatively, the amount of weighting agent may be expressed by weight of dry solids such as in a dry blend. For example, the weighting agent may be present in an amount of from about 1% to about 99% by weight of the dry blend. (e.g., about 1%, about 5%, about 10%, about 20%, about 30%, about 40%, about 50%, about 60%, about 70%, about 80%, about 90%, about 99%, etc.). In some embodiments, the weighting agent may be present in an amount of from about 1% to about 20% and, alternatively, from about 1% to about 10% by weight of dry solids.

In certain embodiments, the density of the aqueous fluid can be adjusted, among other purposes, to provide required density to control wellbore pressure, additional particulate transport and suspension. The water-based drilling fluid may have a density suitable for drilling including a density in a range of from about 0.5 grams per cubic centimeter (g/cc) to about 4.0 g/cc, alternatively from about 0.8 g/cc to about 3 g/cc, alternatively from about 1.0 g/cc to about 2.5 g/cc, or any ranges therebetween.

The water-based drilling fluids comprising de-oiled cake may be effective over a range of pH levels. For example, the de-oiled cake may provide effective lubrication from a pH of about 7 to about 12. Additionally, the water-based drilling fluids of the present disclosure may be suitable for a variety of subterranean formations, including, but not limited to shale formations and carbonate formations. In certain embodiments, the pH of the water-based drilling fluids may be adjusted (e.g., by a buffer or other pH adjusting agent) to a specific level, which may depend on, among other factors, the types of viscosifying agents, acids, and other additives included in the water-based drilling fluids.

The water-based drilling fluids may further include a viscosifying agents. Suitable viscosifying agents include, but are not limited to, clays and clay derivatives, polymeric additives, diatomaceous earth, and polysaccharides such as starches. Combinations of viscosifying agents may also be suitable. The particular viscosifying agent used depends on a number of factors, including the viscosity desired, chemical compatibility with other fluids used in formation of the wellbore, and other well bore design concerns. The viscosifying agent may be present in the water-based drilling fluid in an amount of from about 1 wt. % to about 60 wt. % of the water-based drilling fluid. Alternatively, the viscosifying agent may be present in the water-based drilling fluid in an amount of about 1 wt. % to about 10 wt. %, about 10 wt. % to about 20 wt. %, about 20 wt. % to about 30 wt. %, about 30 wt. % to about 40 wt. %, about 40 wt. % to about 50 wt. %, about 50 wt. % to about 60 wt. %, or any ranges therebetween. Alternatively, the amount of viscosifying agent may be expressed by weight of dry solids such as in a dry blend. For example, the viscosifying agent may be present in an amount of from about 1% to about 99% by weight of the dry blend. (e.g., about 1%, about 5%, about 10%, about 20%, about 30%, about 40%, about 50%, about 60%, about 70%, about 80%, about 90%, about 99%, etc.). In some embodiments, the viscosifying agent may be present in an amount of from about 1% to about 20% and, alternatively, from about 1% to about 10% by weight of dry solids.

The water-based drilling fluids may further include lost circulation materials and/or bridging agents. Examples of lost circulation materials or bridging agents suitable for certain embodiments of the present disclosure include, but are not limited to ground marble, resilient graphitic carbon, walnut shells, calcium carbonate, magnesium carbonate, limestone, dolomite, iron carbonate, iron oxide, calcium oxide, magnesium oxide, perborate salts, and the like, and any combination thereof. The lost circulation materials and/or bridging agents may be present in the water-based drilling fluid in an amount of from about 1 wt. % to about 60 wt. % of the water-based drilling fluid. Alternatively, the lost circulation materials and/or bridging agents may be present in the water-based drilling fluid in an amount of about 1 wt. % to about 10 wt. %, about 10 wt. % to about 20 wt. %, about 20 wt. % to about 30 wt. %, about 30 wt. % to about 40 wt. %, about 40 wt. % to about 50 wt. %, about 50 wt. % to about 60 wt. %, or any ranges therebetween. Alternatively, the amount of lost circulation materials and/or bridging agents may be expressed by weight of dry solids such as in a dry blend. For example, the lost circulation materials and/or bridging agents may be present in an amount of from about 1% to about 99% by weight of the dry blend. (e.g., about 1%, about 5%, about 10%, about 20%, about 30%, about 40%, about 50%, about 60%, about 70%, about 80%, about 90%, about 99%, etc.). In some embodiments, the lost circulation materials and/or bridging agents may be present in an amount of from about 1% to about 20% and, alternatively, from about 1% to about 10% by weight of dry solids.

The water-based drilling fluids may further include bentonite, a swelling clay. Bentonite helps in sealing borehole walls, removing drill cutting, and lubricating the cutting head. The bentonite may be present in the water-based drilling fluid in an amount of from about 1 wt. % to about 60 wt. % of the water-based drilling fluid. Alternatively, the bentonite may be present in the water-based drilling fluid in an amount of about 1 wt. % to about 10 wt. %, about 10 wt. % to about 20 wt. %, about 20 wt. % to about 30 wt. %, about 30 wt. % to about 40 wt. %, about 40 wt. % to about 50 wt. %, about 50 wt. % to about 60 wt. %, or any ranges therebetween. Alternatively, the amount of bentonite may be expressed by weight of dry solids such as in a dry blend. For example, the bentonite may be present in an amount of from about 1% to about 99% by weight of the dry blend. (e.g., about 1%, about 5%, about 10%, about 20%, about 30%, about 40%, about 50%, about 60%, about 70%, about 80%, about 90%, about 99%, etc.). In some embodiments, the bentonite may be present in an amount of from about 1% to about 20% and, alternatively, from about 1% to about 10% by weight of dry solids.

The water-based drilling fluid may further include an additional additive including, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, viscosifiers, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. The additional additive may be present in the water-based drilling fluid in an amount of from about 1 wt. % to about 60 wt. % of the water-based drilling fluid. Alternatively, the additional additive may be present in the water-based drilling fluid in an amount of about 1 wt. % to about 10 wt. %, about 10 wt. % to about 20 wt. %, about 20 wt. % to about 30 wt. %, about 30 wt. % to about 40 wt. %, about 40 wt. % to about 50 wt. %, about 50 wt. % to about 60 wt. %, or any ranges therebetween. Alternatively, the amount of additional additive may be expressed by weight of dry solids such as in a dry blend. For example, the additional additive may be present in an amount of from about 1% to about 99% by weight of the dry blend. (e.g., about 1%, about 5%, about 10%, about 20%, about 30%, about 40%, about 50%, about 60%, about 70%, about 80%, about 90%, about 99%, etc.). In some embodiments, the additional additive may be present in an amount of from about 1% to about 20% and, alternatively, from about 1% to about 10% by weight of dry solids.

The water-based drilling fluids may be used in a variety of wellbore drilling applications. For example, methods may include drilling a well bore while the water-based drilling fluid is circulated in the well bore. As described herein, the deoiled cake may be included in the drilling fluid, for example, as a lubricant to reduce the coefficient of friction.

The FIGURE represents one or more embodiments of the de-oiled cake in a water-based drilling fluids. It should be noted that while the FIGURE generally depicts a land-based drilling assembly, those skilled in the art will readily recognize that the principles described herein are equally applicable to subsea drilling operations that employ floating or sea-based platforms and rigs, without departing from the scope of the disclosure.

As illustrated in the FIGURE, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the drill bit 114 rotates, it creates a wellbore 116 that penetrates various subterranean formations 118.

A pump 120 (e.g., a mud pump) circulates wellbore fluid 122 (e.g., a water-based drilling fluid with the de-oiled cake described herein) through a feed pipe 124 and to the kelly 110, which conveys the wellbore fluid 122 downhole through the interior of the drill string 108 and through one or more orifices in the drill bit 114. The wellbore fluid 122 is then circulated back to the surface via an annulus 126 defined between the drill string 108 and the walls of the wellbore 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the de-oiled cakes of the present disclosure may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the de-oiled cakes of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the de-oiled cakes of the present disclosure may be stored, reconditioned, and/or regulated until added to the wellbore fluid 122.

The de-oiled cakes of the present disclosure will lubricate the components and equipment of the drilling assembly 100. For example, the de-oiled cakes of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary lost circulation materials.

The de-oiled cakes of the present disclosure will reduce drag and thus, may directly or indirectly affect the pump 120, which representatively includes any conduits, pipelines, trucks, tubulars, and/or pipes used to fluidically convey the lost circulation materials downhole, any pumps, compressors, or motors (e.g., topside or downhole) used to drive the water-based drilling fluid, including the de-oiled cakes as lubricating additive, into motion, any valves or related joints used to regulate the pressure or flow rate of the lost circulation materials, and any sensors (i.e., pressure, temperature, flow rate, etc.), gauges, and/or combinations thereof, and the like. The de-oiled cakes of the present disclosure may also directly or indirectly affect the mixing hopper 134 and the retention pit 132 and their assorted variations.

The de-oiled cakes of the present disclosure may also directly or indirectly affect the various downhole equipment and tools that may come into contact with the lubricate additive such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The de-oiled cakes of the present disclosure may also directly or indirectly affect any downhole heat exchangers, valves and corresponding actuation devices, tool seals, packers and other wellbore isolation devices or components, and the like associated with the wellbore 116. The de-oiled cakes of the present disclosure may also directly or indirectly affect the drill bit 114, which may include, but is not limited to roller cone bits, PDC bits, natural diamond bits, any hole openers, reamers, coring bits, etc.

The methods and compositions of the present disclosure may also directly or indirectly affect the various downhole equipment and tools that may come into contact with the fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

Accordingly, the present disclosure may provide methods, systems, and apparatus that may relate to water-based drilling fluids comprising a de-oiled cake. The methods, systems. And apparatus may include any of the various features disclosed herein, including one or more of the following statements.

Statement 1. A method of drilling comprising: introducing a a water-based drilling fluid into a drill string disposed within a wellbore; circulating the water-based drilling fluid through the drill string and the wellbore; and extending the wellbore using the drill string while circulating the water-based drilling fluid, wherein the water-based drilling fluid comprises: water; and a lubricating additive comprising a de-oiled cake, wherein the de-oiled cake are residues obtained after extraction of oil from a plant source, wherein the de-oiled cake is in particulate form having a particle size of 100 microns or less.

Statement 2. The method of drilling of statement 1, wherein the plant source comprises at least organic material selected from the group consisting of peanut, coconut, soybean, sunflower, cottonseed, safflower, palm, rapeseed, corn, olive, sesame, almond, walnut, mustard, rice bran, and any combination thereof.

Statement 3. The method of drilling of statement 1 or statement 2, wherein the de-oiled cake has a particle size of 90 microns or less.

Statement 4. The method of drilling of any preceding statement, wherein the de-oiled cake has a particle size of 65 microns or less.

Statement 5. The method of drilling of any preceding statement, wherein the largest particle size of the de-oiled cake is in a range of 30 μm to 100 μm.

Statement 6. The method of drilling of any preceding statement, wherein the de-oiled cake is present in an amount of about 1% to about 50% by weight of the water-based drilling fluid.

Statement 7. The method of drilling of any preceding statement, wherein the water-based drilling fluid forms a fluid column disposed within the wellbore and wherein the de-oiled cake is present throughout the fluid column.

Statement 8. The method of drilling of any preceding statement, further comprising preparing the water-based drilling fluid by mixing a dry blend comprising the de-oiled cake with the water to form the water-based drilling fluid.

Statement 9. The method of drilling of any preceding statement, further comprising preparing the water-based drilling fluid by mixing a liquid additive comprising the de-oiled cake with the water to form the water-based drilling fluid.

Statement 10. The method of statement 10, wherein the liquid additive comprises an oleaginous carrier fluid.

Statement 11. The method of drilling of any preceding statement, wherein the water-based drilling fluid has a coefficient of friction of 0.25 or less.

Statement 12. The method of drilling of any preceding statement, wherein a weighting agent is present in the water-based drilling fluid in an amount of about 1% to about 60% by weight of the water-based drilling fluid.

Statement 13. The method of drilling of any preceding statement, wherein the water-based drilling fluid has a pH of about 7 to about 12.

Statement 14. The method of drilling of any preceding statement, wherein the water-based drilling fluid has a density of about 0.5 g/cc to about 4 g/cc.

Statement 15. method of drilling comprising: introducing a water-based drilling fluid into a drill string disposed within a wellbore; circulating the water-based drilling fluid through the drill string and the wellbore; and extending the wellbore through a non-loss zone using the drill string while circulating the water-based drilling fluid, wherein the water-based drilling fluid comprises: water; and a lubricating additive comprising a de-oiled cake, wherein the de-oiled cake are residues obtained after extraction of oil from a plant source.

Statement 16. A water-based drilling fluid comprising: water; and a lubricant additive comprising a de-oiled cake, wherein the de-oiled cake are residues obtained after extraction of oil from a plant source and wherein the de-oiled cake has a particle size of 100 microns or less.

Statement 17. The water-based drilling fluid of statement 16, wherein the de-oiled cake has a particle size of 75 microns or less.

Statement 18. The water-based drilling fluid of statement 16 or 17, wherein the de-oiled cake is present in an amount of about 1% to about 50% by weight of the water-based drilling fluid.

Statement 19. The water-based drilling fluid of any of statements 16 through 18, wherein a weighting agent is present in the drilling fluid in an amount of about 1% to about 60% by weight of the drilling fluid.

Statement 20. The water-based drilling fluid of any of statements 16 through 19, wherein the water-based drilling fluid has a density of about 0.5 g/cc to about 4 g/cc.

To facilitate a better understanding of the present invention, the following examples of certain aspects of some embodiments are given. In no way should the following examples be read to limit, or define, the entire scope of the disclosure.

EXAMPLES

A de-oiled cake obtained from mustard seeds was finely grounded and sieved to powder with median particle size, $D_{50}$, about 700 μm ($10^{-6}$ m) or below, or about 100 μm or below, or about 90 μm or below, or about 65 μm or below. When $D_{50}$ is about 65 μm or below, the $D_{100}$ is about 75 μm or below, i.e., all the particles size are below 75 μm. Then, the powder was mixed in a water-based drilling fluid. FANN® and Falex lubricity measurements were performed on an 8.70 ppg Bentonite based mud. Three 8.70 ppg Bentonite based fluids were formulated as per below table 1 and hot rolled at 200° F. for 16 hours. Blank fluid without any lubricant showed a coefficient of friction (CoF) of 0.44, whereas for fluid with a commercial polymeric lubricant showed 0.35 CoF i.e., 20.83% reduction in friction comparing to blank fluid. Fluid with mustard de-oiled cake powder showed 0.29 CoF, which is 35.42% reduction in friction compared to the blank and showed a reduction of CoF on par to that of the commercial polymeric drilling fluid additive, as showed in Table 1 below. Falex lubricity was determined for 8.7 ppg bentonite-based fluid as showed in Table 1. The blank fluid showed a CoF of 0.33 at 300 lb (136.2 kg) load. Fluid containing a commercial polymeric lubricant, or Reference 1, drilling fluid additive showed a CoF of 0.09, i.e., a 72% reduction in the coefficient of friction and the film strength was 1000 lb. The fluid containing de-oiled cake showed a CoF of 0.07, i.e., a 79% reduction in the coefficient of friction with film strength of 1000 lb.

TABLE 1

8.70 ppg Bentonite-Based Mud Formulations

| Additives | Blank Fluid | Fluid 1 | Fluid 2 |
|---|---|---|---|
| Water, ppb | 340 lb | 340 lb | 340 lb |
| Bentonite, ppb | 25 lb | 25 lb | 25 lb |
| Caustic, ppb | 0.1 lb | 0.1 lb | 0.1 lb |
| De-oil cake powder, ppb | — | 10.5 lb | — |
| Polymeric Lubricant, ppb | — | — | 10.5 lb |

Hot rolled at 200° F./16 hr
Rheology at 120° F.

| | 1 AHR | 2 AHR | 3 AHR |
|---|---|---|---|
| 600 | 95 | 54 | 65 |
| 300 | 77 | 38 | 52 |
| 200 | 67 | 33 | 44 |
| 100 | 55 | 24 | 38 |
| 6 | 31 | 16 | 27 |
| 3 | 29 | 15 | 21 |
| PV | 18 | 16 | 13 |
| YP | 59 | 22 | 39 |
| Gels 10 s | 27 | 21 | 35 |
| Gels 10 m | 73 | 46 | 82 |
| pH | 8.4 | 8.13 | 8.67 |
| HTHP fluid loss @250° F., 30 min | 42 ml | 24 ml | 30 ml |
| FANN® Lubricity: | | | |
| CoF | 0.44 | 0.29 | 0.35 |
| % Reduction | — | 35.42 | 20.83 |
| Falex Lubricity: | | | |
| CoF | 0.33 | 0.07 | 0.09 |
| % Reduction | — | 79% | 72% |
| Film Strength | 300 lb | 1000 lb | 1000 lb |

FANN® lubricity measurements were also checked in 10 ppg (997.76 kg/m³) NaCl/polymer-based fluid. Three 10 ppg NaCl/polymer-based fluids were formulated as per Table 2 below and hot rolled at 250° F. for 16 hours. Post hot rolling FANN® lubricity measurements were performed for all three fluids at room temperature and results are tabulated in Table 2. For blank fluid without any lubricant, a CoF of 0.27 was observed, whereas for fluid with the commercial polymeric drilling fluid additive, a CoF of 0.22 was measured, i.e., a 18.18% reduction in friction compared to the blank fluid. Fluid with de-oiled cake powder showed a CoF of 0.18, which is a reduction of 33.33% in the CoF compared to that of blank fluid and showed an improved CoF reduction compared to that of the commercial polymeric lubricant.

TABLE 2

10 ppg NaCl/Polymer-Based Fluid Formulations

| Additives | Blank Fluid | Fluid-3 | Fluid-4 |
|---|---|---|---|
| Water, ppb | 308 | 308 | 308 |
| NaCl salt, ppb | 60 | 60 | 60 |
| BARAZAN® D PLUS, ppb | 0.75 | 0.75 | 0.75 |
| N-DRIL® HT PLUS, ppb | 6 | 6 | 6 |
| BARABUF®, ppb | 0.75 | 0.75 | 0.75 |
| BARACARB® 5, ppb | 15 | 15 | 15 |
| BARACARB® 25, ppb | 30 | 30 | 30 |
| ALDACIDE G, ppb | 0.3 | 0.3 | 0.3 |
| De-oil cake powder, ppb | — | 10.5 | — |
| Polymeric Lubricant, ppb | — | — | 10.5 |
| Mud weight | | 10 ppg | |

Hot rolled at 250 F./16 hr
Rheology at 120° F.

| | AHR | AHR | AHR |
|---|---|---|---|
| 600 | 27 | 45 | 60 |
| 300 | 18 | 35 | 45 |
| 200 | 15 | 30 | 38 |
| 100 | 10 | 26 | 30 |
| 6 | 3 | 11 | 14 |
| 3 | 2 | 10 | 12 |
| PV | 9 | 10 | 15 |
| YP | 9 | 25 | 30 |
| HTHP fluid loss @250° F., 30 min | 14.4 ml | 8.4 ml | 10 ml |
| FANN® Lubricity: | | | |
| CoF | 0.27 | 0.18 | 0.22 |
| % Reduction | — | 33.33 | 18.18 |

Experiments were also performed to assess the impact of the particle size of the de-oiled cake. Four fluids were prepared, and the results are tabulated in Table 3 below.

TABLE 3

| Additives | Blank Fluid | Fluid 5 | Fluid 6 | Fluid 7 |
|---|---|---|---|---|
| Water, lb | 340 | 340 | 340 | 340 |
| Bentonite, lb | 25 | 25 | 25 | 25 |
| Caustic, lb | 0.1 | 0.1 | 0.1 | 0.1 |
| De-oiled cake powder, lb | | | 10.5 (D50 = 65 μm) | 10.5 (D50 = 90 μm) |
| Polymeric Lubricant, ppb | | 10.5 | | |
| Hot rolled at 200 F., 16 hours FANN® Lubricity: | | | | |
| CoF | 0.44 | 0.35 | 0.20 | 0.20 |
| % Reduction | | 20.83 | 54.54 | 54.54 |

The median particle size, $D_{50}$, for Fluid 6 was 65 μm. The median particle size, $D_{50}$, for Fluid 7 was 90 μm. There was no significant difference of coefficient of friction between Fluid 6 and Fluid 7. However, the coefficient of friction of Fluid 6 and Fluid 7 was significantly lower than Fluid 5.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of drilling comprising:
   introducing a water-based drilling fluid into a drill string disposed within a wellbore;
   circulating the water-based drilling fluid through the drill string and the wellbore; and
   extending the wellbore using the drill string while circulating the water-based drilling fluid,
   wherein the water-based drilling fluid comprises:
      water; and
      a lubricating additive comprising a de-oiled cake, wherein the de-oiled cake are residues obtained after extraction of oil from a plant source, wherein the de-oiled cake is in particulate form having a particle size of 100 microns or less.

2. The method of drilling of claim 1, wherein the plant source comprises at least organic material selected from the group consisting of peanut, coconut, soybean, sunflower, cottonseed, safflower, palm, rapeseed, corn, olive, sesame, almond, walnut, mustard, rice bran, and any combination thereof.

3. The method of drilling of claim 1, wherein the de-oiled cake has a particle size of 90 microns or less.

4. The method of drilling of claim 1, wherein the de-oiled cake has a particle size of 65 microns or less.

5. The method of drilling of claim 1, wherein the largest particle size of the de-oiled cake is in a range of 30 μm to 100 μm.

6. The method of drilling of claim 1, wherein the de-oiled cake is present in an amount of about 1% to about 50% by weight of the water-based drilling fluid.

7. The method of drilling of claim 1, wherein the water-based drilling fluid forms a fluid column disposed within the wellbore and wherein the de-oiled cake is present throughout the fluid column.

8. The method of drilling of claim 1, further comprising preparing the water-based drilling fluid by mixing a dry blend comprising the de-oiled cake with the water to form the water-based drilling fluid.

9. The method of drilling of claim 1, further comprising preparing the water-based drilling fluid by mixing a liquid additive comprising the de-oiled cake with the water to form the water-based drilling fluid.

10. The method of claim 9, wherein the liquid additive comprises an oleaginous carrier fluid.

11. The method of drilling of claim 1, wherein the water-based drilling fluid has a coefficient of friction of 0.25 or less.

12. The method of drilling of claim 1, wherein a weighting agent is present in the water-based drilling fluid in an amount of about 1% to about 60% by weight of the water-based drilling fluid.

13. The method of drilling of claim 1, wherein the water-based drilling fluid has a pH of about 7 to about 12.

14. The method of drilling of claim 1, wherein the water-based drilling fluid has a density of about 0.5 g/cc to about 4 g/cc.

15. A method of drilling comprising:
   introducing a water-based drilling fluid into a drill string disposed within a wellbore;
   circulating the water-based drilling fluid through the drill string and the wellbore; and
   extending the wellbore through a non-loss zone using the drill string while circulating the water-based drilling fluid,
   wherein the water-based drilling fluid comprises:
      water; and
      a lubricating additive comprising a de-oiled cake, wherein the de-oiled cake are residues obtained after extraction of oil from a plant source.

16. A water-based drilling fluid comprising:
   water; and
   a lubricant additive comprising a de-oiled cake, wherein the de-oiled cake are residues obtained after extraction of oil from a plant source and wherein the de-oiled cake has a particle size of 100 microns or less.

17. The water-based drilling fluid of claim 16, wherein the de-oiled cake has a particle size of 75 microns or less.

18. The water-based drilling fluid of claim 16, wherein the de-oiled cake is present in an amount of about 1% to about 50% by weight of the water-based drilling fluid.

19. The water-based drilling fluid of claim 16, wherein a weighting agent is present in the drilling fluid in an amount of about 1% to about 60% by weight of the drilling fluid.

20. The water-based drilling fluid of claim 16, wherein the water-based drilling fluid has a density of about 0.5 g/cc to about 4 g/cc.

* * * * *